E. H. STERNS.
Saw-Mill Dogs.

No. 148,771. Patented March 17, 1874.

Witnesses: James J. Kay, Frederick Standish

Inventor: Edward H. Stearns
by Bakewell & Kerr
his attys

UNITED STATES PATENT OFFICE.

EDWARD H. STEARNS, OF ERIE, PENNSYLVANIA.

IMPROVEMENT IN SAW-MILL DOGS.

Specification forming part of Letters Patent No. 148,771, dated March 17, 1874; application filed December 13, 1873.

*To all whom it may concern:*

Be it known that I, EDWARD H. STEARNS, of Erie, in the county of Erie and State of Pennsylvania, have invented a new and useful Improvement in Saw-Mill Dogs; and I do hereby declare the following to be a full, clear, and exact description thereof, reference being had to the accompanying drawing forming a part of this specification, in which—

Figure 1:
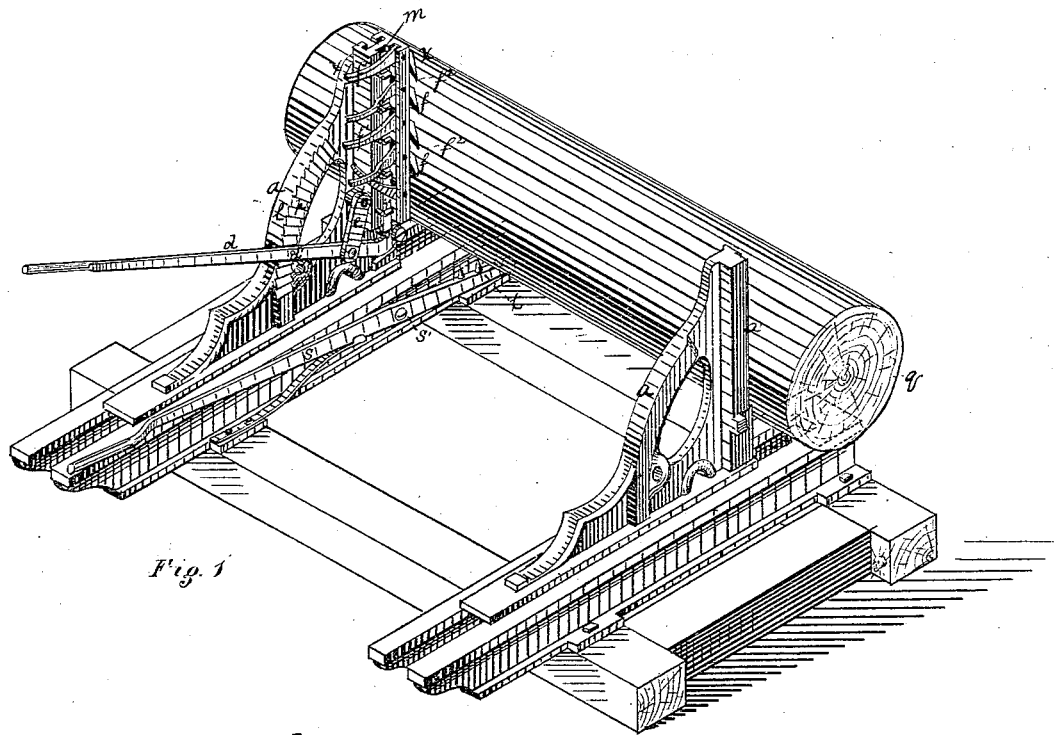
Figure 3:
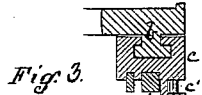
Figure 2:
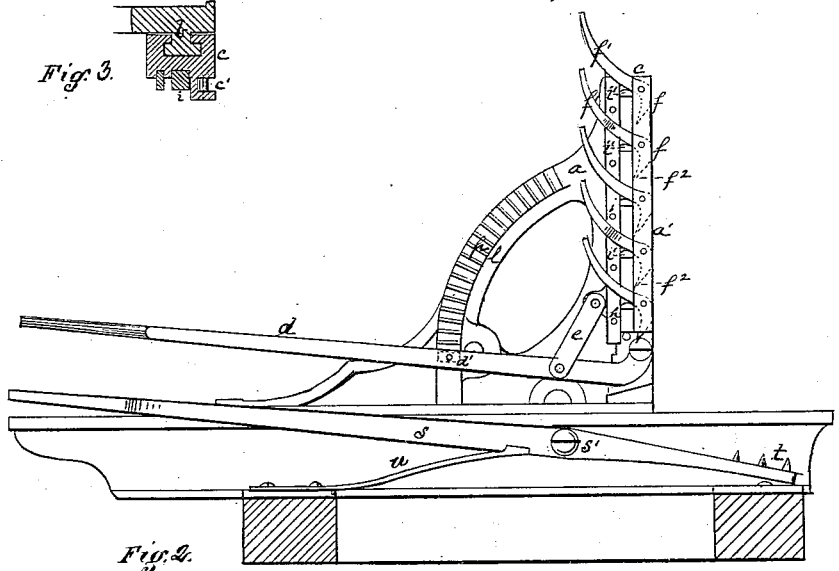

Figure 1 is a perspective view of my improved dogging apparatus, and illustrates the operation of the same. Fig. 2 is a side elevation of my improvement; and Fig. 3 is a section, $x\ x$.

Like letters of reference indicate like parts in each.

My invention relates to that class of dogging attachments which operate on the latch principle, and such that when the log strikes the knee carrying the dogs, it will drive the dog or dogs against which it strikes inside the box or case in which they hang, so that they shall be out of the way, and leave the dog next above the log in position for engaging the same. The box in which the dogs are hung has a vertical motion imparted to it by a lever, and in rising the dogs slip past the side of the log, but upon reversing the lever they are brought down upon and clamp the log upon its upper squared face.

Heretofore these dogging apparatuses have been used with cants—that is, squared logs, remnants, &c.—and the dogs, operating upon a square or flat bearing-surface, project only about half an inch. Moreover, as the cant is cut into boards, the projection of the dogs must be small, to prevent them from encountering and injuring the saw.

The object of my invention is the use or application of this class of dogging attachments with round unprepared logs; and it consists of the modifications and devices necessary to effect such application.

The ordinary sliding knees of a saw-mill carriage are shown at $a$, and the vertical parts or standards at $a'$. By means of a suitable joint at $b$, I connect a vertically-moving dog slide or box, $c$, to one of the standards $a'$. This box is connected with the pivoted lever $d$, whereby it is raised and operated by a link, $e$. In the vertical slot or opening $c'$ on the front side of the box $c$ I pivot a series of dogs, $f$, each having a tail or extension, $f^1$, of considerable length back of the pivoting-point. There is also a preponderance of weight at the same end, which causes the tail $f^1$ to rest upon the stops $h$, when the dogs are hanging free upon their pivots, and throws the points $f^2$ out to the exact engaging point and angle. The points $f^2$ are made round and sharp for the required facility of penetration into the round deflecting face of the log; and, for the purpose of securing a bite therein, they necessarily project about two inches beyond the face of the box $c$. The preponderance of the weight of the tail end of the dog tends to prevent the point from glancing upon the side instead of entering the log. This amount of projection, while objectionable, unnecessary, and injurious in the use of dogging attachments of this nature, with cants, above mentioned, is absolutely necessary in this case, and is not open to danger of interfering with the saw, as the outer slab of a rough round log is several inches thick, and it is in this the dogs take their bite. Set loose in the groove $m$ is a bar, $i$, having pins, lugs, or projections $i'$ on its face, each pin being just below a dog, $f$. This bar rests upon a stop set at a point just above the lower limit of the movement of the box $c$. The effect of this construction is, that when the box $c$ is permitted or made to descend, the motion of the bar $i$ is arrested, first, by the stop, and the box $c$ continuing its descent, the lugs $i'$ encounter the dogs $f$ back of the pivots, and withdraw or throw their points back into the box out of the way when sawing the squared remnant of the log, and from danger of accident from contact with the saw. Upon the face of the knee-brace $l$ is a rack, $p$, which is designed to operate, in connection with the pawl $d'$, under the following circumstances: When the log is rolled on the head-blocks it strikes the knee-standards $a'$. The operator then raises the box $c$ by means of the lever $d$, so that one of the dogs $f$ shall come into engaging position, and then drop or force the lever down, causing the dog to bite into the log, and thereby secure it in position. The saw operates at or upon the log, beginning at the point $q$, and its down or cutting stroke has a strong tendency to roll or turn the log, and thereby to throw up and loosen the engaging dog $f$. The consequence of this would be the inevitable fouling of the log with the saw. The function of the rack $p$ and stop $d'$ is to lock the lever $d$, by which the dogs $f$ are operated, in a proper position to prevent the loosening of the dog. The dogs are ordinarily held in position by the weight of the box $c$ and lever $d$, but this is not sufficient in the case just mentioned.

In dogging a log the operator stands in the rear to operate the lever $d$, and he is enabled to tell the exact moment to reverse the lever by the movement of the long tail of the engaging dog. When this tail falls to a parallel with those above it, it indicates it has cleared the log, and he immediately reverses the lever, forcing the dog down into the log. The lever is then locked in the rack $p$, as described. The dogs $f$ are placed a sufficient distance apart to permit each one to rise clear of the log before the one next below can rise and foul the log and push it away from the standard. When the log is turned, in the usual manner, toward the standard, the dog becomes disengaged, and the lever drops down at rest.

The bar $i$ may be made with slots, through which the tails $f^1$ may project, instead of the lugs to withdraw the dogs.

This dogging apparatus is designed to be used in connection with the apparatus hereinbefore mentioned as used for dogging cants, one being arranged on one side and the other on the other side of the standard $a'$. It is, therefore, necessary that the dogs $f$ be retired entirely within the box $c$ when the cant-dogs are used, as the saw in cutting the cant comes within an inch of the standard. This is done by the weight of the lever and box alone, as they are sufficient to throw the dogs back.

It is very difficult for the dogs $f$ to secure a bite on logs of small diameter, on account of their tendency to roll. I overcome this difficulty by means of the bar $s$, which is pivoted to the frame at $s'$, and is provided with spurs $t$ at its outer end. The rear or lever end of this bar extends to the operator's stand at the rear end of the knee, so as to be operated by him when dogging the log without changing his position. Below the bar $s$ is a spring, $u$, for throwing it back to place. When the log is rolled onto the head-block, the operator places his foot upon the bar $s$, causing the spurs $t$ to catch and hold the log against the downward thrust of the dog. The log being properly dogged, the spur-bar is thrown back to its proper position by the spring $u$.

Having described my invention, what I claim is—

1. The bar $i$, provided with pins $i'$, set loose in the groove $m$, and having a limited independent movement therein, in combination with the box $c$ and dogs $f$, substantially as and for the purposes described.

2. The combination of rack $p$, lever $d$, sliding box $c$, and dogs $f$, substantially as described.

3. The pivoted bar $s$, with the rear end extending to the operator's stand, and provided with spurs $t$ for holding the log, and a spring, $u$, for retracting them and returning the lever to its proper position, as and for the purpose described.

In testimony whereof I, the said EDWARD H. STEARNS, have hereunto set my hand.

EDWARD H. STEARNS.

Witnesses:
GEO. P. GRIFFITH,
L. H. HALL.